(12) United States Patent
Vogel et al.

(10) Patent No.: US 6,870,629 B1
(45) Date of Patent: Mar. 22, 2005

(54) OPTICAL FREQUENCY SWEEP CONTROL AND READOUT BY USING A PHASE LOCK

(75) Inventors: Kurt R. Vogel, Boulder, CO (US); Timothy P. Dinneen, Longmont, CO (US); Michael E. Deeds, Boulder, CO (US); Jason R. Ensher, Lafayette, CO (US); Christopher J. Myatt, Boulder, CO (US)

(73) Assignee: Precision Photonics Corporation, Boulder, CO (US)

( * ) Notice: Subject to any disclaimer, the term of this patent is extended or adjusted under 35 U.S.C. 154(b) by 311 days.

(21) Appl. No.: 10/283,649

(22) Filed: Oct. 29, 2002

Related U.S. Application Data

(60) Provisional application No. 60/365,406, filed on Mar. 18, 2002, and provisional application No. 60/346,009, filed on Oct. 29, 2001.

(51) Int. Cl.[7] .................................................. G01B 9/02
(52) U.S. Cl. ........................................ 356/519; 372/32
(58) Field of Search ................................ 356/450, 451, 356/454, 484, 519; 372/32

(56) References Cited

U.S. PATENT DOCUMENTS 6,331,892 B1 * 12/2001 Green .......................... 356/451
6,370,169 B1 * 4/2002 Imajuku et al. ............... 372/32
6,552,782 B2 * 4/2003 Colbourne et al. ......... 356/124

* cited by examiner

*Primary Examiner*—Samuel A. Turner
*Assistant Examiner*—Michael A. Lyons

(57) ABSTRACT

The invention allows for the accurate, real-time readout of the optical frequency of a swept-wavelength laser device by counting the number of fringes of a calibrated etalon that occur as the laser is swept. The distinguishing feature of the present invention is that the etalon fringe signal is phase-locked to a slave signal of a higher multiple frequency. The higher frequency of the slave signal divides the frequency interval of the etalon fringe spacing by the additional frequency multiple. The slave signal therefore generates a scale for optical frequency that is of higher resolution than possible with the etalon alone. The phase-lock also insures that the slave signal tracks monotonic scans of the optical frequency regardless of scan profile.

The invention also allows for the precise, real-time control of the optical frequency of a laser during the sweep of the laser. By comparing a signal proportional to the transmission of light through a calibrated Fabry-Perot etalon to a reference control signal, the phase difference between etalon transmission signal and the reference signal may be fed back to the laser to drive the phase difference to zero (phase-lock). The phase-lock ensures that the optical frequency profile of the sweep follows exactly the frequency profile of the reference signal. Tailoring the input reference signal controls the velocity of the optical-frequency sweep.

28 Claims, 17 Drawing Sheets

$\Delta T_n = t_n - t_{n-1} = \frac{(FSR/M)}{V_{laser}(t)}$

FSR = a constant optical frequency interval
$V_{laser}(t)$ = Optical frequency scan rate of laser

OPTICAL FREQUENCY SWEEP CONTROL AND READOUT BY USING A PHASE LOCK

CROSS-REFERENCE TO RELATED APPLICATIONS

This application claims priority from U.S. Provisional Patent Application No. 60/346,009, filed Oct. 29, 2001, entitled "Optical Frequency Sweep Control and Readout using a Phase-Lock" and U.S. Provisional Patent Application No. 60/365,406, filed Mar. 18, 2002, entitled "Optical Frequency Sweep Control and Readout using a Phase-Lock," the contents of each of which are incorporated herein by reference.

FIELD OF THE INVENTION

This invention relates to the field of optical frequency control and readout of a coherent radiation source, such as a tunable laser, whose optical wavelength is varied in time from one wavelength to a second wavelength value.

BACKGROUND

Accurate control and readout of the optical frequency of a laser is important for many applications such as high-resolution spectroscopy, time and frequency metrology, interferometry and length metrology, optical-based communication, and optical component characterization. Of current importance is the test and measurement of the wavelength dependence of the properties of optical networking components. Components for fiber-optic networks—such as optical filters, couplers, interleavers, and the like—have critical specifications for insertion loss (IL), polarization dependent loss (PDL), polarization mode dispersion (PMD) and other properties.

Each of these properties depends on the optical wavelength. In a typical application, light from a laser is inserted into a component under test and the transmission and/or reflection properties of the device are recorded as the wavelength of the laser is swept over a range of wavelengths. Accurate knowledge of the wavelength, or optical frequency, which is acquired in near real-time during a wavelength sweep, is of utmost importance for measuring the properties of optical networking components, and in fact will be a critical technology as the channel spacings in fiber-optic networks shrink to accommodate more bandwidth per optical fiber.

Many high-resolution techniques exist for very accurate control of laser frequency sweeps, but these techniques are usually for laboratory experiments where size, cost and complexity of the technique are not of primary importance. A further disadvantage of these techniques is that they are extremely limited in their operational wavelength range and are not useful for characterizing optical networking components. Commercial wavelength meters are better in that they can accurately measure wavelength over a very large wavelength range. However, commercial meters are too expensive and too large to fit into other test instruments. The measurement rates of commercial wavelength meters are also much too slow (1–10 Hz) for the rapid rates of characterization of optical components (1–100 kHz).

There is a need for a wavelength meter that generates accurate real-time measurements and readouts of the optical frequency of a swept, tunable laser. The readout rate must be fast enough to accommodate rapid frequency scans, and accurate over wide optical frequency regions. There is need for the meter to be very compact to fit inside other instruments or small form factors. The meter must be robust and inexpensive.

There is also need for accurate feedback control of the optical frequency of a swept laser source. The optical frequency meter of the feedback monitor must be very compact, inexpensive, robust, fast and accurate over wide frequency ranges.

SUMMARY OF THE INVENTION

The present invention relates to a wavelength meter system for a source of coherent optical radiation in which the optical frequency is changed continuously in time. The system includes an optical artifact positioned at least partially in a first optical beam produced by the optical source, the optical artifact configured to generate an optical artifact signal that is periodic relative to an optical frequency of the first optical beam in response to passage of at least a portion of the first optical beam through the optical artifact. The system also includes an oscillator that generates an oscillator signal having a plurality of oscillator signal ticks. The oscillator signal is phase-locked to the optical artifact signal such that the period of the optical artifact signal is a multiple of a period of the oscillator signal.

The optical artifact may be a dispersive element with a transmission response that has a period that changes relative to the optical frequency of the first optical beam. The optical artifact may be selected from a group consisting of an interferometric device, an etalon, a Mach-Zender interferometer, a Michelson interferometer, a birefringement element coupled with a polarizer, a Lyot filter, an interferometric ring oscillator, and a waveguide loop resonator.

An optical frequency interval traversed by the optical radiation source between each oscillator signal tick of the plurality of oscillator signal ticks may correlate to a free-spectral range (FSR) of the optical artifact divided by some multiple. An optical frequency interval between oscillator signal ticks may be generated by adjusting a phase delay to the optical artifact signal that is used for the phase lock or by adjusting a time delay to each oscillator tick of the oscillator signal. A time interval between each of the plurality of oscillator signal ticks may correspond to an equal interval of optical wavelength. The oscillator ticks may be produced with time intervals between ticks that correspond to an adjustable optical frequency, wherein adjustment of the optical frequency is produced by adjusting the optical artifact to adjust the periodicity of the optical artifact signal.

A phase error signal may be generated in proportion to a phase difference between the optical artifact signal and the oscillator signal divided in frequency by the multiple, the phase error signal being provided as an input to the oscillator to control the phase difference.

The system may further include a data acquisition system wherein data logged in time thereby is correlated to the oscillator signal to generate optical frequency data in the data acquisition system. The oscillator signal may trigger the data acquisition system. The system may further include an optical frequency calibration system that determines an optical frequency corresponding to each of the oscillator signal ticks.

The system may further include an optical power splitter that divides the first optical beam into second and third optical beams, a first optical power detector that measures an optical power of a portion of the second optical beam that travels through the optical artifact, an optical frequency reference positioned along a path of the third beam and having at least one optical spectral feature at a known optical frequency, and a second optical power detector that measures an optical power of a portion of the third optical beam that travels through the optical frequency reference. The system may further include a third optical power detector that generates a signal in proportion to the first optical beam, the signal normalizing signals generated from the first and second optical power detectors.

The optical frequency reference may be selected from a group consisting of an atomic/molecular gas cell, an optical fiber Bragg grating, an optical thin-film filter, and a low-thermal expansion etalon. The optical frequency of each oscillator tick may be determined from a known calibration of the FSR of the optical artifact and a known optical frequency reference location during a scan of optical frequency of the source of coherent optical radiation that produces the first optical beam. The optical frequency of each oscillator tick may be determined by correlating oscillator tick locations to two or more known optical frequency reference locations by using a statistical estimation method. Subsequent to a sweep of an optical frequency of the coherent radiation source, frequency errors in an oscillator tick axis may be reduced by making a correction to each oscillator tick frequency location based upon recorded phase errors between the optical artifact signal and the oscillator signal divided in frequency by the multiple.

A normalized trigger level for each period of the optical artifact signal may be generated by detecting a maximum and minimum of the optical artifact signal over each previous period of the optical artifact signal. The system may further include a processor that detects mode-hops of the source of coherent optical radiation by detecting a substantially discontinuous phase difference between the optical artifact signal and the oscillator signal divided in frequency by the multiple.

The present invention also relates to a wavelength control system for a source of coherent optical radiation in which the optical frequency is changed continuously in time. The system includes an optical artifact positioned at least partially in a first optical beam produced by the optical source, the optical artifact configured to generate an optical artifact signal that is periodic relative to an optical frequency of the first optical beam in response to passage of at least a portion of the first optical beam through the optical artifact. The system also includes an oscillator that generates an oscillator signal having a plurality of oscillator signal ticks. A phase error signal is generated in proportion to a phase difference between the optical artifact signal and the oscillator signal, the phase error signal being used to control the source of the continuously changed optical frequency to control the phase difference.

The optical source may be a tunable laser and the phase error signal may be provided to a velocity control input to the tunable laser. The phase error signal may be filtered prior to being provided as an input to the optical source. The filtering may include integration and amplification. The oscillator signal generated by the oscillator may be variable based on the optical frequency.

The present invention also relates to an optical spectrum analyzer device for analyzing an unknown source of coherent optical radiation. The device includes a first source of coherent optical radiation in which the optical frequency is changed continuously in time, a heterodyne optical receiver that detects both the first source of coherent optical radiation together with the unknown source of coherent optical radiation, and a wavelength meter system receptive of the frequency of the optical radiation from the first source. The wavelength meter system includes an optical artifact receptive of light from the first source, the optical artifact configured to generate an optical artifact signal that is periodic relative to an optical frequency of the light from the first source in response to passage of at least a portion of the light from the first source through the optical artifact. The wavelength meter system also includes an oscillator including a processor that generates a plurality of oscillator signal ticks that are each spaced by a time interval correlating to an interval of the optical frequency of the first source that is a multiple in proportion to a period of the signal of the optical artifact, wherein the oscillator tick signal is phase-locked to the periodic signal of the optical artifact. The system also includes an optical frequency reference that generates at least one signal with known optical frequency, used for determining the optical frequency of the oscillator signal ticks. Interference relative to detection of the first source and the second unknown source generates a signal whose phase and amplitude, coupled with the optical frequency of each oscillator signal tick, determine the optical power and optical frequency spectrum of the second unknown source.

The present invention also relates to an optical test system for testing a device under test. The test system includes a source of coherent light that can be controlled to sweep through a range of optical frequencies and a wavelength measurement device receptive of a portion of the light from the light source, the device providing a periodic signal as an output therefrom, the periodic signal having a period that relates to the rate of change of the optical frequency of the light from the light source. The system also includes an interface between the light source and the device under test to provide light thereto, an interface between the device under test and the optical test system for receiving optical or electrical signals therefrom, and a data acquisition system receptive of the optical or electrical energy received from the device under test and receptive of the periodic signal from the wavelength measurement device. The periodic signal allows the data acquisition system to correlate the signals received from the device under test to the optical frequency of the light provided to the device under test.

The wavelength measurement device may further provide a signal indicative of the initial optical frequency and the optical frequency interval between each of the periods of the periodic signal.

DETAILED DESCRIPTION OF THE PREFERRED EMBODIMENTS

In accord with the needs stated above, the present invention provides a novel method for accurate, real-time control and readout of the optical frequency of a laser during the sweep of the frequency of the laser. The method uses easily obtained components and compact design, leading to a relatively inexpensive and very robust instrument. The method also operates over a very large frequency range, as well as during very high-speed scans. The combination of accuracy, speed, flexibility and economy is a significant improvement over the prior art.

The present invention relies on the periodic optical transmission of an interferometric optical component, such as a Fabry-Perot etalon or a Michelson interferometer. If a laser is transmitted through the interferometric element and the laser scans monotonically in frequency, the output of the optical transmission and reflection of the interferometric element varies periodically with a period known as the free spectral range (FSR) (Hecht, *Optics*, 2$^{nd}$ Ed., 1987, the contents of which are incorporated herein by reference). The characteristic waveform associated with one FSR is commonly referred to as a fringe. By counting the number of these periods or fringes encountered during a monotonic frequency scan, the optical frequency $f$ is measured with a resolution of the FSR: $f=f_o+N*FSR$, where N is the number of counted fringes and $f_o$ is the optical frequency of the first counted fringe. With this method, high measurement resolution of the frequency can be achieved by using interferometers with a small FSR. Since the FSR scales inversely with the optical path length of the interferometer, large devices are necessary for achieving an FSR small enough to give high resolution. For instance, a fused silica etalon with FSR of 50 GHZ is 2 mm long. Improving the resolution to 1 GHz requires an etalon that is 100 mm long.

Throughout this application, the term optical artifact refers to a device that receives an optical signal and provides an optical output that varies periodically as the wavelength of the optical input is either increased or decreased monotonically. An optical artifact can be a variety of different devices including, but not limited to, an etalon (including optical fiber-based etalons and multiple-mirror resonator cavities), an interferometer (including Mach-Zender and Michelson interferometers), a Lyot filter, a birefringent element coupled with a polarizer, an interferometric ring oscillator, a waveguide loop resonator, and any other optical resonators or interferometric devices. Several of these devices are illustrated in FIGS. 1(a), 1(b), 1(c), 1(d), 1(e) and 1(f).

Figure 2:
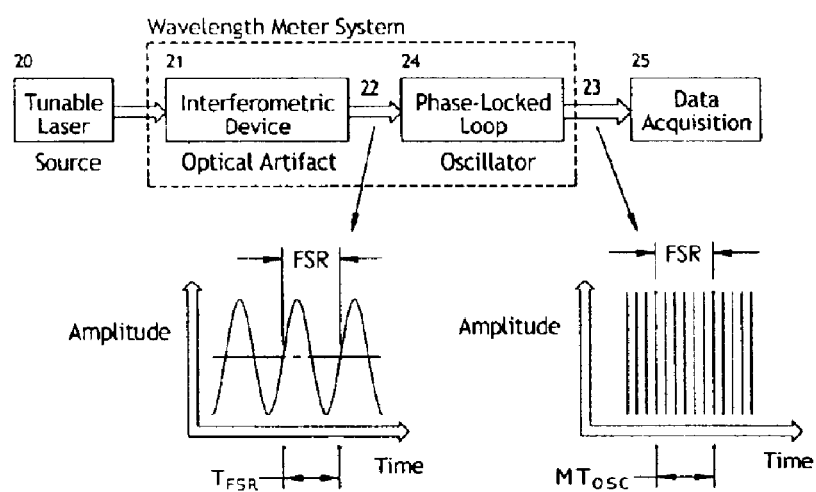
FIG. 2 shows the scheme for generating an oscillator tick signal that is phase-locked to an optical artifact signal.

In various embodiments, the present invention overcomes the requirement of a small FSR for high resolution by precisely subdividing the fringes of an optical artifact. A schematic of the technique is shown in FIG. 2. As the optical frequency of a tunable laser source 20 is swept, the transmission of the laser light through an optical artifact 21 is detected. The output signal 22 from artifact 21 is time-varying and periodic, with a time period equal to the FSR of the interferometer divided by the scan rate of the laser. To subdivide a fringe, oscillator signal 23 is generated by a phase-locked loop (PLL) 24. The PLL 24 phase-locks the periodic output of the optical artifact to a time-varying signal (e.g., a series of pulses) with a period that is an integer M times smaller than the period of the interferometer output. Output fringes (pulses) of the oscillator signal 23 trigger test instrument 25 to make a measurement. Over the same range of frequencies, slave oscillator signal 23 will have exactly M more cycles of the PLL than the optical artifact output. The measured optical frequency is given by $f=f_0+p*FSR/M$, where p is the number fringes counted of oscillator signal 23 and the remaining terms are defined above. The measurement precision is FSR/M, a factor of M improvement. The phase-lock insures that the optical frequency readout remains precise regardless of the specific time-dependence of the monotonic scan of the optical frequency (see the detailed discussion of the PLL below).

The ticks of oscillator signal 23 of the PLL 24 are used to trigger data acquisitions of a test instrument 25. The term tick (or signal tick) and crossing (such as zero-crossing or level-crossing) are used throughout this application to refer to any signal characteristic(s) that can be used as indicating a fixed (normalized-amplitude) position (or positions) in a period of a time-varying signal. This could be a peak or trough in a sine wave, a rising or falling edge of a square wave, and any other similar indicator or multiple of these indicators. For example, triggering a digital pulse generator on specific level crossings of the optical artifact fringes generates an optical artifact signal and signifies the passing of one FSR frequency interval. An oscillator produces a digital pulse train that is phase-locked to the optical artifact signal, and the rising edges of the pulses, or the oscillator signal ticks, are used to trigger a measurement of a test instrument. The test instrument may be a counter, an analog-to-digital converter, or any instrument capable of being triggered. The oscillator ticks correlate the measurements of test instrument 15 (for instance, optical measurements like PDL, IL, and chromatic dispersion) to a calibrated optical frequency. Throughout this application the term clock shall refer to a series of timing pulses or ticks. Unlike clocks that are used in many digital circuits, the clocks referred to in this application will not necessarily be separated by equal intervals of time.

One of the goals of the present invention is to linearize (or otherwise track in a readily-calibrated way) the optical frequency output of a tunable laser. In practice, non-ideal behaviors of the tuning mechanism of a swept laser contribute systematic deviations of the laser's optical frequency away from the desired scan profile. Additionally, environmental perturbations, due to vibration, acoustic noise, and temperature drifts, create deviations in the optical frequency from the target profile. The phase-lock tracks the time-varying fluctuations in the period $T_{FSR}$ between the FSR frequency intervals of the optical artifact such that the period of the oscillator is $T_{osc}=T_{FSR}/M$. Throughout this application, the term phase-lock refers to the condition where a slave oscillator ("oscillator signal") tracks both the phase and frequency, or some multiple M thereof, of a master oscillator ("optical artifact signal") in such a way as to ensure that every cycle (period) of the master oscillator corresponds to exactly M integer cycles of the slave oscillator. Servo-control feedback from a phase detector to the slave oscillator normally guarantees the phase-lock condition. The Nyquist criteria dictates that the closed-loop bandwidth for corrections to the optical frequency must necessarily be smaller than half the update rate of the error signal: $f_{BW}<1/(2T_{FSR})$. For example see G. F. Franklin et al., *Feedback Control of Dynamic Systems*, $2^{nd}$ Ed., 1991, the contents of which are incorporated herein by reference. Accordingly, an advantage of the phase-lock is that changes in the optical frequency profile that occur slower than $2T_{FSR}$ are tracked, allowing precise readout of the optical frequency regardless of the shape of the profile of the optical frequency scan over the frequency range of interest. On the other hand, any deviations from linearity in the profile of the optical frequency that occur faster than $2T_{FSR}$ (e.g. due to non-ideal tuning or frequency-jitter of the laser) are not corrected and will lead to a residual error in the readout of optical frequency. The present invention reduces tracking errors of the slave oscillator by optimally choosing the FSR of the optical artifact to be sufficiently small (for instance, by choosing a sufficiently long etalon) so that non-linear deviations of the optical frequency of the scanning laser are small over optical frequency intervals of twice the FSR.

As an example of an appropriate optical artifact, a 25 mm long air-spaced etalon (corresponding to an FSR of 6 GHz), phase-locked with a slave signal at a frequency multiplier of 128, yields a frequency resolution just under 50 MHz (0.4 picometers (pm) at 1550 nm). Since an air-spaced etalon is chosen, dispersion contributes less than 1 MHz to the change in the FSR per fringe, and can therefore be considered negligible. By choosing an etalon with an FSR of 6 GHz, the PLL can track fluctuations in the laser frequency that occur on scales larger than a 12 GHz period. For many swept tunable lasers (such as the New Focus Vidia-Swept 6428), large-amplitude (1–2 GHz), "slow" (over optical frequency ranges greater than 12 GHz) fluctuations of the optical frequency from linearity dominate the laser frequency noise. Thus, a 6 GHz FSR is sufficient to track these frequency changes to establish a tick scale that has a residual deviation from linearity of about 0.1–0.2 GHz. Residual errors arise from "fast", low-amplitude fluctuations of the laser frequency that occur during periods less than 12 GHz, which the PLL is incapable of tracking.

The above argument suggests that one can do better by using a longer artifact (smaller FSR), but one goal of the invention is to avoid using impractically large optical artifacts. It should be obvious that the PLL technique described here could also be used with methods that derive more than one reference trigger crossing per fringe, i.e., methods that subdivide a single optical artifact fringe into more than one equal frequency interval. For instance, triggering on both an "up" slope crossing and a "down" slope crossing of an interferometer fringe can achieve a factor of two improvement in the update rate without having to employ a longer interferometer. Many other techniques for subdividing fringes will be obvious to ones skilled in the art.

Figure 3:
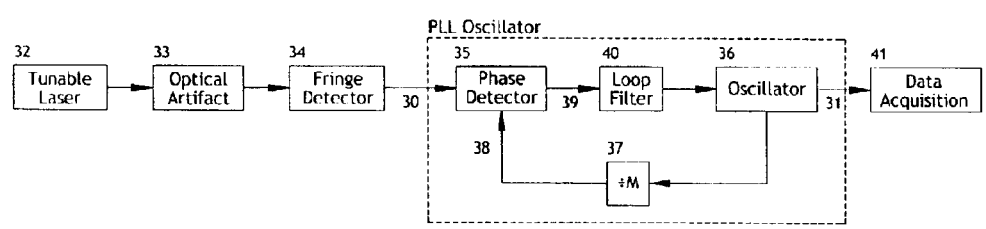
FIG. 3 illustrates the general embodiment of using a phase-locked loop to produce an oscillator tick signal that has exactly a frequency M times that of the optical artifact signal.
Figure 4:
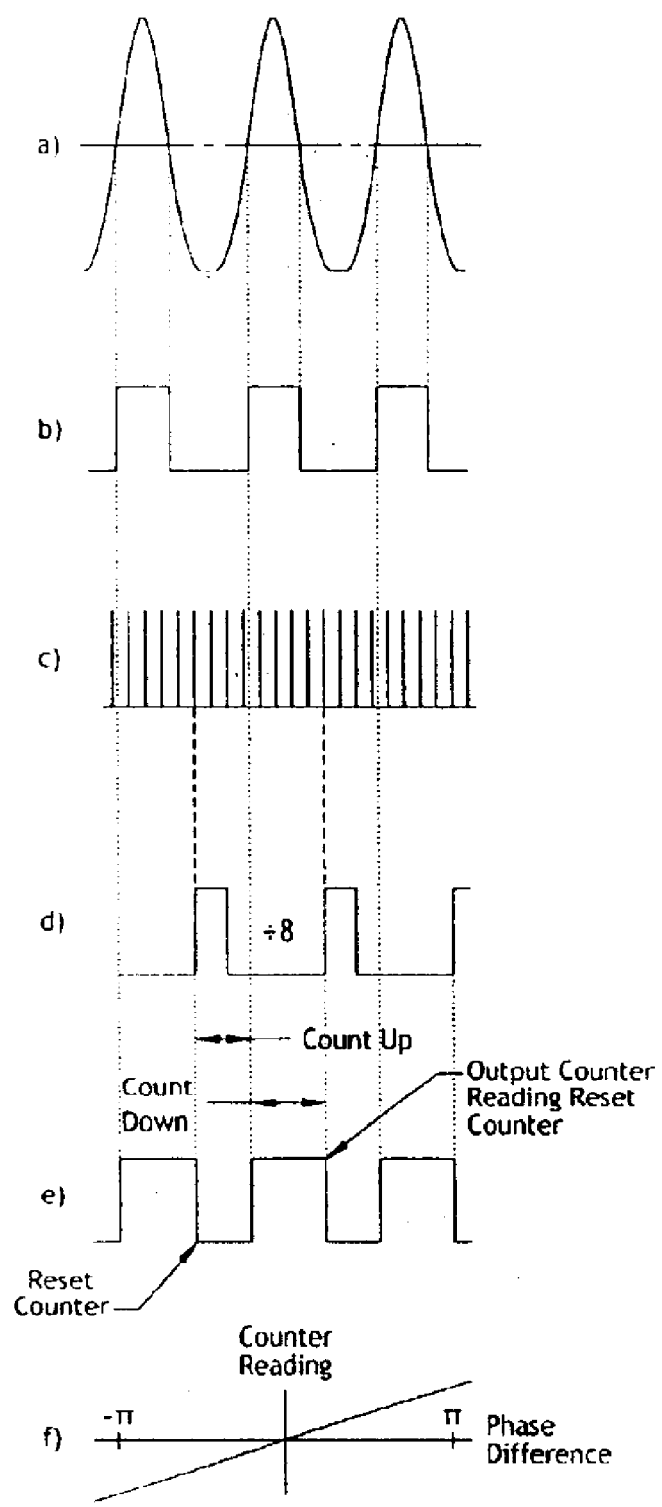
FIG. 4 illustrates typical signals generated from some of the components shown in FIG. 3.

FIG. 3 shows a general phase-lock topology that maintains phase control between an optical artifact signal 30 and an oscillator signal 31. FIG. 4 shows some typical signals that are generated from the elements in FIG. 3. Light from tunable laser 32 is sent to optical artifact 33, which generates a waveform similar to that shown in FIG. 4a. Fringe detector 34 generates optical artifact signal 30 (FIG. 4b) by detecting periodic and equal optical frequency intervals of optical artifact 33. For example, a fringe detector could be an electronic comparator, which compares two signals and asserts a digital logic signal high or low depending on whether one signal is higher or lower than the other (see FIGS. 4a and 4b). Signal 30 is coupled to a first input of phase detector 35. Throughout this application, a phase detector refers to a device that generates a signal proportional to the phase difference of two input oscillator signals, and includes without limitation multipliers, doubly-balanced mixers, and all methods of digital phase detection. An oscillator 36 generates oscillator signal 31 (FIG. 4c), of which a portion is coupled to a divider 37. Divider 37 generates signal 38 whose frequency is divided by an integer multiple M (FIG. 4d, with M=8 as an example). Divided-down signal 38 is coupled to a second input of phase detector 35. Phase detector 35 generates a phase error signal 39 in proportion to the phase difference between the optical artifact signal 30 and the divided-down oscillator signal 38. The phase differences are exhibited in FIG. 4c, where the ticks of the oscillator signal are not coincident with the level of the fringe detector in FIG. 4a or the digital logic signal in FIG. 4b. As an example phase-detection method (FIG. 4e), a digital up/down counter is triggered to start incrementing on the rising edge of the divided-down signal 38. Upon receiving the rising edge of artifact signal 30, the counter begins to decrement until another rising edge is detected on signal 38, after which the counter is read and then reset to begin phase measurement of the next fringe. The counter signal (FIG. 4f) is proportional to the phase error, and is counted with a time resolution greater than either the artifact or the divided-down oscillator signal. Many other phase-detection methods will be obvious to those skilled in the art. The phase error signal 39 is coupled to oscillator 36 via loop filter 40 to control the phase between optical artifact signal 30 and oscillator signal 31. A loop filter conditions an error signal (in this case, phase error 39) so that the feedback control loop is stable and optimized, and typically contains elements such as gain amplifiers and low-pass filters. The scope of this invention applies to embodiments in which any or all of the PLL oscillator elements are digital in nature, analog in nature, or both. Oscillator tick signal 31 can be used to trigger, or otherwise correlate, a measurement of data acquisition system 41.

Figure 5:
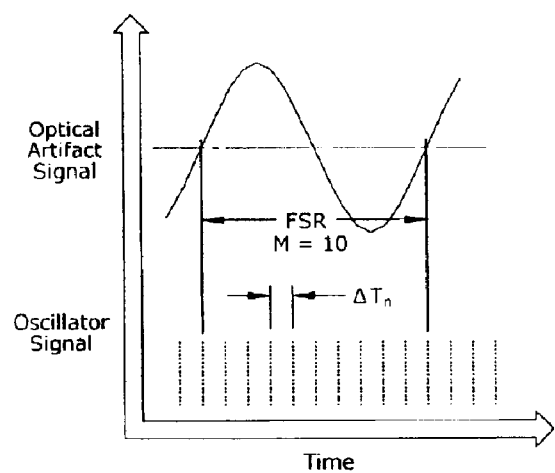
FIG. 5 shows the how the time interval between oscillator tick signals is related to the optical frequency scan rate of the laser.

It should be emphasized that this invention provides an oscillator signal that has ticks that are separated by a constant interval (or a non-constant controlled interval) of optical frequency. It is not necessarily the case, however, that the ticks are separated by a constant time interval. This is true because the light source (or laser) typically does not sweep through its frequency range at an ideal and exactly constant rate. Instead, the laser may, at points in its range or under certain operating conditions, sweep faster at times and sweep slower at times. During these times the oscillator signal ticks will not have a constant time interval between them, but they will have a substantially constant (or programmed) optical frequency interval. We illustrate this further by referring to FIG. 5. The time interval between each oscillator signal tick of the plurality of oscillator signal ticks correlates to a single optical frequency interval during the sweep of the optical frequency of a tunable laser source. The time between ticks of the oscillator signal is given by the (FSR/M)/v(t), where divided M is the PLL multiple and v(t) is time-dependent scan rate of the laser in units of optical frequency per unit time. In some embodiments of the present invention, the FSR is constant relative to optical frequency and scan time of the laser. The time between ticks of the oscillator signal is controlled by the scan rate of the laser. For instance, if the scan rate is constant in units of optical frequency per unit time, then the time between oscillator signal ticks is constant. If the scan rate changes, then so will the time between ticks. Yet, regardless of the laser scan rate, each time interval between ticks of oscillator signal will correspond to a fixed interval of optical frequency because the FSR is constant and the oscillator is phase-locked to the optical artifact signal.

Until now, the FSR of an optical artifact has been assumed fixed and unchanging with respect to optical frequency, but dispersion typically causes this to be otherwise. Dispersion is the result of a frequency-dependent change in the refractive index of a material. Dispersion in the optical material used in the optical artifact causes the FSR to change with frequency, resulting in non-equal frequency intervals between optical artifact fringes. Subsequently, the oscillator ticks do not represent a linear scale. The change of FSR over a typical measurement range, say 100–200 nm, should preferably be about 1 MHz or less, for most applications. One method of reducing dispersion effects is to construct the reference etalon with extremely low or zero dispersion materials, such as an air- or vacuum-spaced etalon. Care must be taken that any reflective coatings used in the optical artifact also exhibit negligible dispersion. An embodiment of an optical artifact that fits this description would be an air-spaced Fabry-Perot etalon that uses Fresnel reflections of uncoated fused silica (or any other type of glass) substrates as the end mirrors.

Figure 6:
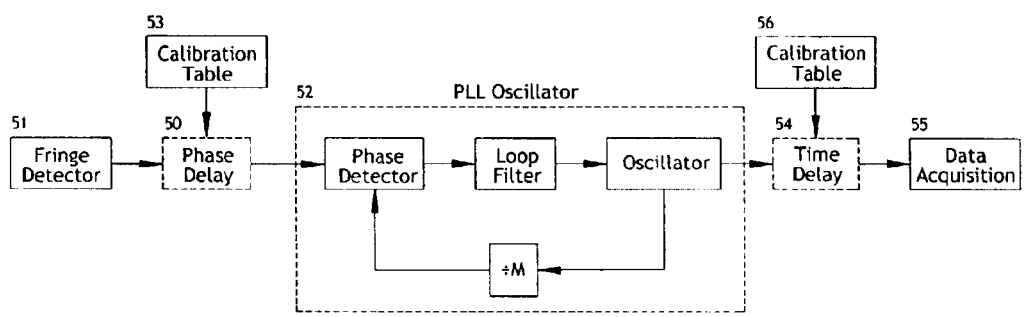
FIG. 6 shows two methods for manipulating the frequency interval between oscillator ticks during a frequency scan of a laser.

Dispersive optical artifacts may be used if the change in the FSR with optical frequency can be calibrated. Two methods for linearizing a dispersive optical artifact are shown in FIG. 6. In the first method, a phase delay section 50 is added after the optical artifact fringe detector 51 and before the PLL oscillator circuit 52. The tick from the fringe detector is delayed by a calibrated amount stored in calibration table 53, which corrects for the dispersion to make the frequency interval between fringe ticks equal. Likewise, another method delays the PLL oscillator ticks by a calibrated amount (from calibration table 56) by placing a delay circuit 54 between PLL oscillator 52 and data acquisition circuit 55. The exact implementation of either strategy depends on the nature of the dispersion. For instance, a solid etalon may be made of a glass that has a dispersion that results in an FSR that decreases quadratically with optical frequency. Because of the quadratic dependence, the tick output can be linearized in optical frequency simply by delaying every tick by a fixed amount. For more complicated dispersion profile, a calibration table of the FSR for each fringe order can be accessed, applying a slightly different delay at each counted order. A practical device for implementing these embodiments is a field-programmable gate array (FPGA), which is capable of performing many complex digital operations simultaneously and in real-time.

The above methods for linearizing the optical frequency can also be used to customize the frequency scale. For instance, some applications may benefit from a frequency scale where the interval between oscillator ticks is equal in wavelength, as opposed to equal in frequency. This might be accomplished by constructing a solid etalon from a dispersive material where the change in the FSR with optical frequency results in fringe ticks that are linear in wavelength. Because of the difficulty of finding materials with the required dispersion, the methods mentioned above for delaying the optical artifact fringe output or the oscillator tick output could also be used to create a linear wavelength scale.

Producing a linear calibration scale in optical frequency greatly improves the precision of optical frequency readout, but it does not address the accuracy of said readout. Another primary goal of the present invention is to provide methods for accurate determination of the absolute optical frequency of each PLL oscillator tick output. Then, measurements that are triggered by the PLL oscillator can be correlated with high accuracy to an optical frequency. For a linear tick scale, two calibration values are sufficient for this calibration: the absolute frequency of one of the tick marks ($f_j$) and the spacing between tick intervals ($\Delta f$). The optical frequency of the $i^{th}$ tick mark is then given by $f_i = f_j + (i-j)\Delta f$. Two general categories of methods for absolute frequency calibration are discussed. The first uses a single reference frequency marker to determine the optical frequency $f_o$ of the first oscillator tick (also referred to as the frequency offset), in addition to a known calibration of the FSR of the optical artifact to provide the frequency spacing $\Delta f$ between oscillator ticks. The second uses two or more reference frequency markers to ascertain both $f_o$ and $\Delta f$. Typical embodiments have the tunable laser light split into two portions, one of which is directed to the optical artifact to produce the oscillator ticks, and another which is directed to a device that is capable of generating one or more frequency markers. Typical devices usually rely on detecting the absorption of the tunable laser light at specific well-known optical frequencies. Without limitation, such devices include atomic/molecular gas absorption cells, fiber Bragg gratings, thin-film filters, and low-thermal-expansion etalons (etalons constructed of materials with thermal coefficients less than fused silica glass, such as Zerodur, or using designs that compensate thermal expansion in the optical path length of the etalon).

Figure 1:
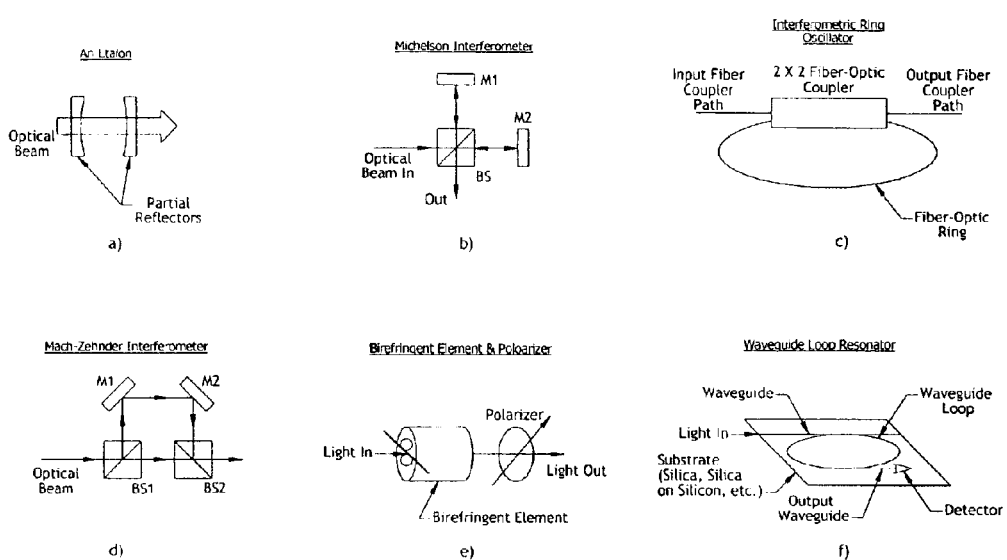
FIGS. 1(a), 1(b), 1(c), 1(d), 1(e) and 1(f) show a few of the variety of different devices that may serve as an optical artifact.
Figure 7:
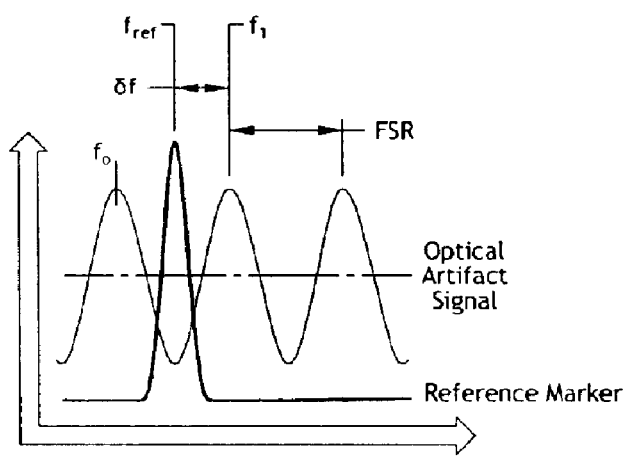
FIG. 7 shows methods for absolute frequency calibration of the oscillator ticks by using a single optical frequency reference and a known calibration of the free-spectral range of the optical artifact.

The first category of calibration methods depends on referencing the first oscillator tick to a single optical frequency marker $f_{ref}$ of known frequency, in conjunction with a known calibration of the tick spacing $\Delta f$(FSR/M). Two methods exist for implementing this approach, each illustrated in FIG. 7. The first method relies on calibrating the frequency location $f_o$ of an artifact fringe that is adjacent (or nearby) to $f_{ref}$, so that the marker acts to uniquely identify the calibrated fringe. This relaxes the long-term accuracy requirement of the frequency marker by requiring that it drift no more than one FSR. This is easily accomplished with many types of frequency references, such as fiber Bragg gratings. On the other hand, long-term accuracy of $f_o$ can only be guaranteed with an artifact that is exceptionally stable to temperature drift. Generally, this is a difficult engineering task. The second method offers a better solution by using a frequency reference with excellent long-term accuracy, such as a gas cell or an athermal fiber Bragg grating, and interpolating the fractional order of the reference peak $f_{ref}$ between the two artifact fringes $f_o$ and $f_i$. Referring to FIG. 1c, the fractional order multiplied by the FSR gives the value $\delta f$ which calibrates the frequency offset $f_o = f_{ref} - \delta f$. In this manner, an accurate calibration of $f_o$ can be performed on every scan, and now the tolerance on the frequency stability of the optical artifact can be relaxed.

Figure 8:
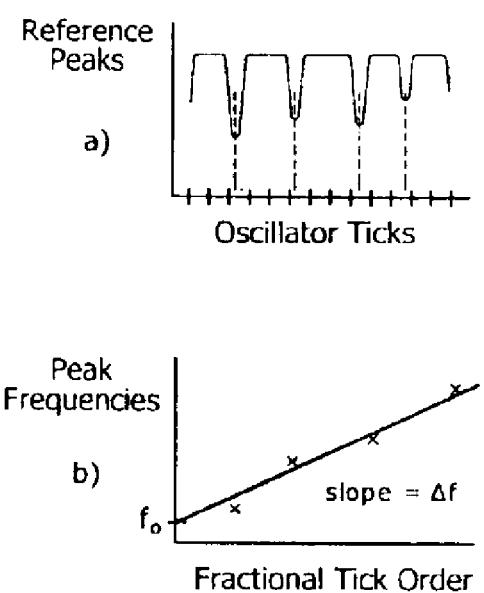
FIG. 8(a) is a graph showing how multiple frequency reference features are correlated to the fractional oscillator tick orders for the purposes of absolute frequency calibration of the oscillator ticks.
FIG. 8(b) illustrates the use of a least-squares fitting algorithm of the known reference frequencies to the fractional tick orders for purposes of generating calibration parameters for determining the absolute frequency of each oscillator tick.

A distinct disadvantage of the above methods is that they rely on the calibration of the artifact FSR to be constant, and so the optical artifact is required to be athermal and resistant to environmental perturbations that may cause length fluctuations (and hence FSR fluctuations). The second category of calibration methods alleviates this requirement by using two or more optical frequency references to determine both $f_o$ and $\Delta f$. Using the generated oscillator tick signal as a linear scale, the position of each reference peak can be interpolated between tick markers, as shown in FIG. 8a. The correlation of the fractional tick locations with the known frequencies of the reference peaks should be linear, but measurement noise and PLL tracking errors will cause slight deviations from linearity. A least-squares linear fit of the counted fractional tick orders to the set of known reference frequencies will give the best estimate of the frequency offset $f_o$ of the first oscillator tick and the frequency spacing $\Delta f$. This is shown in FIG. 8b, where the y-intercept is $f_o$ and the slope of the line yields $\Delta f$. While two reference frequencies are adequate for deriving $f_o$ and $\Delta f$, a more reliable estimate is obtained by fitting to many reference frequencies, such as those available from a molecular gas absorption cell. In this approach, the optical artifact is calibrated for every scan, and so the artifact need only be stable in its FSR over the time period of a single wavelength scan, which is typically less than a minute for a widely tunable laser source.

It should be noted that this strategy can be adopted for not only a linear tick scale but for other functional dependencies as well. An important distinction is the use of a dispersive optical artifact, where the tick intervals can be well approximated by a quadratic scale where the tick intervals have a cubic dependence on optical frequency. Instead of a linear fit, the exact frequencies for each tick can be established by a non-linear least-squares fit to a quadratic function. It should also be noted that the fitting method is not restricted to only a least-squares estimation, but that this analysis can be applied to any statistical estimator based on the method of maximum likelihood (see P. R. Bevington et al., *Data Reduction and Error Analysis for the Physical Sciences*, $2^{nd}$ Ed., 1992, the contents of which are incorporated herein by reference).

The total accuracy of the optical frequency scale calibration is related to two effects: 1) the error associated with correctly determining the peak centers and the level crossings of the optical frequency references and the optical artifact fringes; and 2) the errors associated with the PLL tracking of the tunable laser. With regards to errors associated with determining peak centers and level crossings, these can be reduced in a number of ways: choosing references and artifacts with narrow features, improving the signal-to-noise ratio, and eliminating systematic effects that shift the peak centers and fringe crossings, like residual etaloning effects and over-aggressive electronic filtering. The errors associated with PLL errors are dependent on the frequency noise of the tunable laser, which may depend on a number of factors such as the wavelength scan speed and the drive train of the tunable laser. As discussed earlier, frequency noise that occurs faster than twice the update rate of the PLL cannot be adequately suppressed, and will lead to tracking errors.

Figure 9:
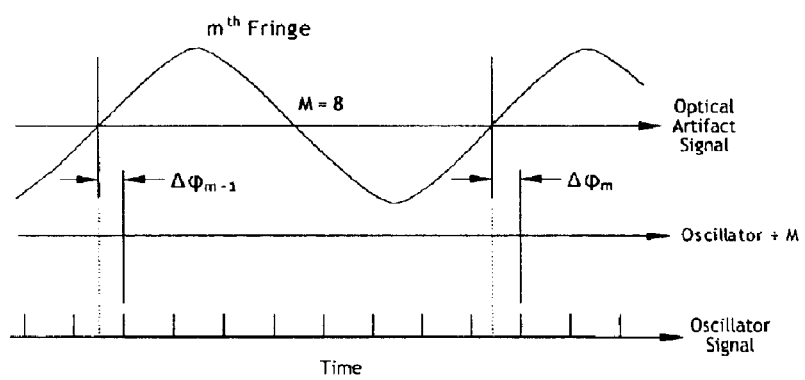
FIG. 9 shows how the phase errors for each fringe of the optical artifact are determined.

PLL tracking errors are measured by the phase detector, and can be stored for later use in post-correcting the oscillator tick scale to eliminate PLL errors. The total phase error associated with an optical artifact fringe is the deviation of a divided-down oscillator tick location from the tick location of the corresponding fringe. This is illustrated in FIG. 9. The PLL phase errors $\Delta\phi_m$ are sufficient information for re-scaling the oscillator tick axis so as to produce a more precise optical frequency scale. As an example, if the desired oscillator tick scale was linear and the phase error for the $m^{th}$ artifact fringe is $\Delta\phi_m$, then the re-scaled oscillator tick axis is obtained by adding the correction term $(\Delta\phi_m - \Delta\phi_{m-1})/M$ to each of the M oscillator tick locations that occurred within the $m^{th}$ artifact fringe. The corrected tick axis is a more precise linear scale that can now be used in conjunction with known frequency references (with methods described above) to more accurately determine the optical frequency of each oscillator tick. The disadvantage of this method is that more computation time is needed for the post-correction, leading to slower update rates between laser wavelength scans.

In some applications, the user may want to specify or adjust the frequency interval between oscillator ticks. In one embodiment, the oscillator ticks are produced with time intervals between ticks that correspond to an optical frequency interval that may be adjusted by altering the FSR of the optical artifact. In various embodiments, the user might adjust the optical path length in the optical artifact by changing the physical length of the optical path in the optical artifact, or through electronic or thermal change of the index of refraction in the optical path. An example of an optical artifact with adjustable periodicity is an air-spaced etalon constructed such that the position of the end-mirrors of the etalon are controlled via a motor, a piezoelectric actuator or driver, or similar devices for creating an adjustable and controlled translation motion.

An additional utility of the present invention is its ability to detect mode-hops during a wavelength scan of a tunable laser. Mode-hops of a tunable laser source might be characterized by transient changes in the optical frequency, and to a lesser degree, changes in the optical amplitude. A processor can be provided in the present invention that detects mode-hops of a frequency-swept laser by detecting a substantially discontinuous phase difference between the optical artifact signal and the oscillator signal divided in frequency by the multiple of the oscillator signal period. One embodiment of mode-hop detection might constitute noting anomalously large phase errors between the optical artifact signal and the divided-down oscillator signal, and attributing the error to possible optical frequency transients. In practice, transients in the optical power of the laser source might confuse the triggering of the signal directly from optical artifact. A signal proportional to optical power, such as measured with third optical power detector, would allow normalization of optical artifact signal for changes in optical power. Optical power detection enables embodiments wherein the invention notes both optical power and optical frequency changes in the laser.

Figure 10:
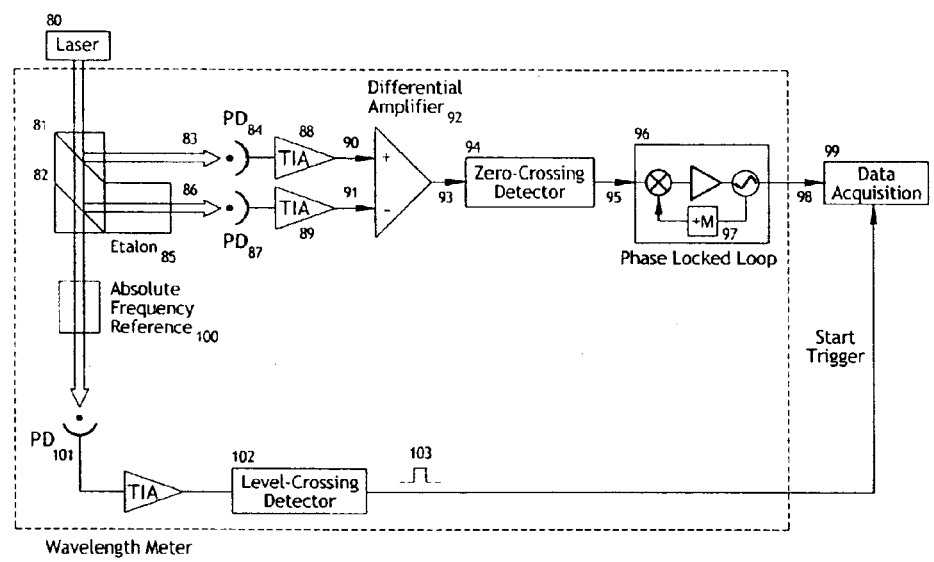
FIG. 10 illustrates an embodiment in which the laser light is free-space coupled to the wavelength meter system.

As an example of one embodiment of the present invention, FIG. 10 shows a configuration suited to the case of free space coupling of a laser into the wavelength meter. In case, the state of polarization of the laser is well known and stable and the polarization effects of the beamsplitters and photodiodes do not change in time. Laser 80 of a stable and known state of polarization generates an output beam that passes through beamsplitters 81 and 82, each splitting off a portion of the main optical beam. The optical beam 83 reflected from the first beamsplitter 81 is detected by a first photodetector 84. The beam reflected from the second beamsplitter 82 is sent to etalon 85, which generates an optical beam 86 whose power is in proportion to the frequency of laser 80. Etalon 85 has a known FSR. A second photodetector 87 measures the power of optical beam 86. Transimpedance amplifiers (TIA) 88 and 89 convert the photocurrents from photodetectors 84 and 89, respectively, into voltage signals 90 and 91, respectively, which are coupled to a differential amplifier 92.

Figure 11:
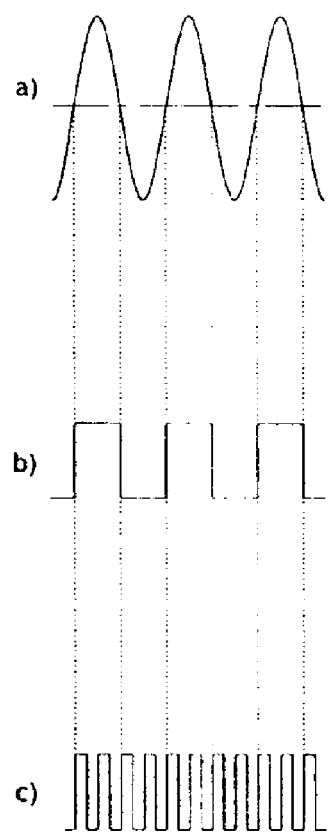
FIG. 11 shows typical signals from some of the components shown in FIG. 10.

Differential amplifier 92 generates a signal 93 that is in proportion to the difference between signals 90 and 91. The relative voltage levels of signals 90 and 91 are configured so that their voltage difference generates a zero-point crossing of the optical artifact that is independent of input power fluctuations from laser 80. A typical signal 93 is shown in FIG. 11a. The desired level crossing of the optical artifact can be adjusted by changing the relative level of signal 90 compared to signal 91. This may be performed in several ways. The split ratio of the beamsplitters 81 and 82 may be selected to give the desired offset in optical power. The relative gain of signal 90 to signal 91 may be altered through changes to the gain in the TIA's 88 and 89 or in the differential amplifier 92 that compares the two signals. A zero-crossing detector 94 asserts digital signal 95 high when the input signal 93 goes positive. Signal 95 remains high until signal 93 goes negative, whereupon signal 95 is asserted low until the next zero-crossing. The digital signal 95 is shown in FIG. 11b.

Signal 95 is input to a phase-locked loop (PLL) 96. The PLL 96 contains a divide by M counter 97 in the phase feedback loop such that output signal 98 from PLL 96 varies in time with a frequency M times that of the input signal 95. An example waveform for M=4 is shown in FIG. 11c. The phase-lock ensures that signal 98 is synchronized with the signal 86 transmitted through the etalon 85. Any of the constituent components of PLL 96 may be analog or digital. The oscillator tick signal 98 is coupled to data acquisition system 99 to trigger a measurement. The measurements triggered by signal 98 can be correlated to a specific optical frequency at a specific time in the sweep.

The absolute value of the laser frequency may be established by triggering the data acquisition system 99 to start making measurements (triggered by oscillator ticks) when the laser frequency sweeps past an optical frequency reference, such as a calibrated peak of an etalon, a calibrated transmission feature of a fiber Bragg grating, or known absorption peaks of a gas cell. In the embodiment of FIG. 10, light transmitted through beamsplitters 81 and 82 reaches absolute frequency reference 100. Photodetector 101 measures the light transmitted through the frequency reference 100. When the light transmitted through the frequency reference 100 drops below a specific level, due to absorption of light from the reference feature, level-crossing detector 102 produces a pulse 103 that triggers the data acquisition system 99 to make measurements. Using the calibration methods described above (see FIG. 7, for example), the optical frequency of the first oscillator tick is known. Using this calibration and the known FSR of etalon 85, the optical frequency of each oscillator tick, and therefore each measurement, is known to high accuracy.

Figure 12:
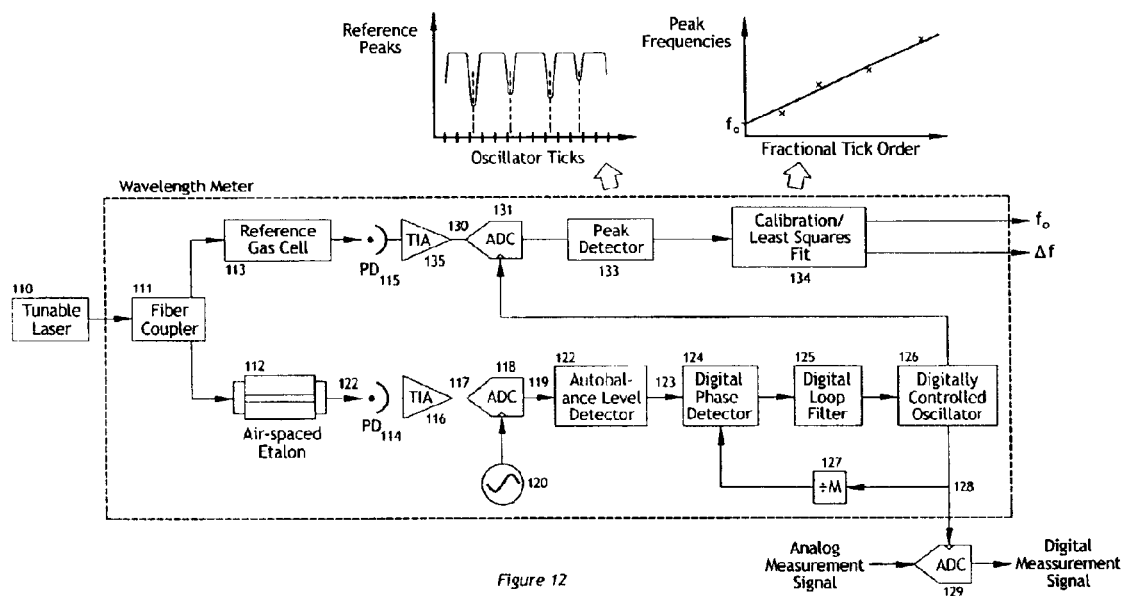
FIG. 12 illustrates a preferred embodiment in which the laser light is fiber-coupled to the wavelength meter system.

In another embodiment, the present invention may be improved to make the readout of optical frequency substantially independent of the polarization state of the input light. The advantage of a polarization-independent readout of the optical frequency is that the invention may be used in a fiber-coupled configuration in which the state of polarization is not known and may change over time. FIG. 12 shows this preferred embodiment. Light from a tunable laser 110 is split into two portions by a 1×2 fiber coupler 111 of small polarization-dependent splitting ratio (PDSR), substantially reducing any polarization dependence. The light from both channels is then collimated. The light in one channel passes through the optical artifact 112, which in this case is an air-spaced etalon, and the light in the other channel passes through a molecular gas cell 113 that has known frequency references in the wavelength region of interest. Both the cell 113 and the etalon 112 can be made insensitive to input polarization by keeping the incident angles of the light near zero. The transmitted light of both channels is detected by photodetectors 114 and 115, and their photocurrents are converted to acceptable voltage levels by TIA's 116 and 135. The analog signal 117 from TIA 116 is converted to a digital signal 119 by an ADC 118, which is triggered by clock 120 at a rate sufficiently fast to characterize the etalon fringes.

Figure 13:
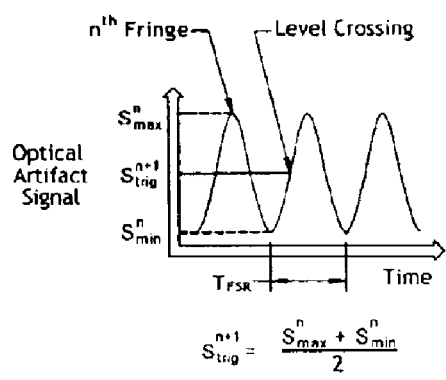
FIG. 13 details the auto-balancing level detection scheme used for detecting power-normalized level crossings of the optical artifact.

The ADC signal 118 is a digital representation of the transmitted power 121 of the etalon beam, and is sent to an "auto-balancing" level detector 122, which is a key element to the embodiment. The auto-balancing level detector 122 uses digital logic or (fast) software to record the most recent maximum and minimum of the optical artifact waveform (ADC signal 118), and then uses this information to automatically detect in real-time when the signal level equals the desired trigger level for the next fringe. Shown in FIG. 13, the auto-balancing technique effectively normalizes the level detection to power fluctuations without the need (and cost) of a second beamsplitter and a second photodetector. The auto-balancing technique works well in the situation inherent in many swept tunable lasers: fluctuations in the optical power of the laser occur over a time greater than $T_{FSR}$, the elapsed time between etalon fringes. When the normalized amplitude level is detected, a digital trigger signal 123 is sent to the first clock input of a digital phase detector 124 of an all-digital phase-locked loop (ADPLL) comprised of a digital loop filter 125, a digitally controlled oscillator 126, and a digital divider 127. The ADPLL multiplies the input fringe signal 123 by M to produce the oscillator tick signal 128, which triggers a measurement of the analog-to-digital converter 129.

Absolute frequency calibration of the oscillator ticks 128 is performed by first converting the analog signal 130 of the gas cell channel to digital signal 132 by ADC 131. To facilitate identification of the atomic/molecular peak locations, ADC 131 is triggered by the equal-frequency-spaced oscillator ticks 128. A digital peak detector 133 locates the fractional tick order for each peak found in digital signal 132. The frequency positions of the oscillator ticks are calibrated by a linear least-squares fit 134 of the known reference frequencies to the fractional tick orders. The optical frequency of the first tick location and the frequency spacing between tick intervals is sent to the user after the scan is completed, and are used to assign the $i^{th}$ oscillator tick with the calibrated frequency $f_i = f_o + i \Delta f$. The $i^{th}$ data conversion of ADC 129 can therefore be correlated to optical frequency $f_i$.

It should be clear to those skilled in the art that certain details of the specific embodiments in FIGS. 10 and 12 may be changed without deviating from the present invention. A partial list of these modifications follows. The optical artifact signal may be generated in reflection rather than transmission. Alternative ways of determining level crossings of an optical artifact are also possible, such as using a comparator (instead of an ADC) to sense sharp signal transitions of a high finesse etalon that has narrow peaks. An oscillator tick signal that is phase-locked with the etalon optical signal may be generated in alternate ways, some purely analog.

Moreover, the phase lock may be created in a number of different electronic configurations, some using a single chip, others employing a plurality of discrete components. The phase lock may also be implemented in software.

In the forms discussed above, the present invention is well-suited as a wavelength measurement device for test instruments that require wavelength calibration for swept wavelength measurements. The beamsplitters and etalons may be constructed monolithically using optical contacting techniques (e.g. anodic bonding, surface optical contact, diffusion bonding, etc.) for robustness and compactness. The frequency reference, whether a gas cell (such as an HCN cell) or a Bragg grating or the like, should occupy very little space. The electronics are straightforward and limited enough that only a small circuit card is necessary. Overall, the present invention may be small enough for bench-top test instruments, hand-held meters, cards for instrument racks, and cards for personal computers. Moreover, the output integrates well with instruments for swept wavelength measurement. The PLL clock output may be used to trigger the data acquisition of the test instrument, which insures temporal correlation (aside from pulse delays) between measurement of wavelength and the optical property of interest. This measurement topology allows very accurate calibration of the optical frequencies of a swept tunable laser with minimum communication bandwidth.

Figure 14:
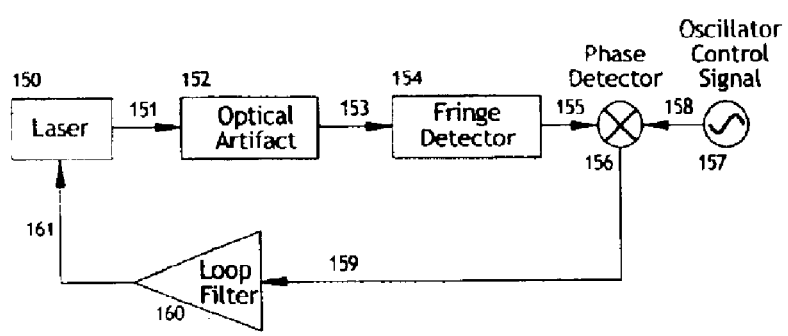
FIG. 14 shows the scheme for controlling the optical frequency scan rate of a laser by feedback of the phase difference between a reference oscillator signal and an optical artifact signal.

A powerful feature of this invention is the ability to precisely control the optical frequency output of a scanning tunable laser. Instead of using the phase error generated by the phase detector to control an output oscillator, the error is used as feedback to control the sweep velocity profile of a laser, i.e., the tunable laser is substituted for the oscillator in the phase-locked loop circuit. The laser sweep profile is controlled by an input reference waveform to the phase detector. FIG. 14 shows a generalized schematic of this functionality. Laser 150 generates an optical beam 151 that enters an optical artifact 152 that has a known FSR. Fringe detector 154 detects level-crossings of the power transmission 153 of optical artifact 152, generating signal 155 as a first input to phase detector 156. An (electronic) oscillator 157 generates a control signal 158 that is coupled to a second input of phase detector 156. The reference frequency ($f_{ref}$) of oscillator 157 is selected based on the desired sweep profile of the laser frequency, $df_{laser}/dt$, divided by the free spectral range FSR of the optical artifact 152: $f_{ref}(t)=(df_{laser}/dt)/FSR$. Note that the reference frequency can be time-dependent to allow for a programmed velocity change (acceleration) in the laser frequency.

Phase detector 156 compares optical artifact signal 155 to reference oscillator signal 157 and determines the phase error between them. The phase error signal 159 from phase detector 156 is coupled to a loop filter 160 that integrates and amplifies the error signal with a certain time constants that will depend on the noise characteristics of the laser, the laser scan rate, and the update rate of error signal 159. The time period of noise or drift in the laser's frequency will set the upper end of the time constants, for any correction signal generated over a longer time scale will not be effective in controlling the noise in the laser's optical frequency output. On the other end, the time constant should not be shorter than the update time of error signal 159, otherwise the feedback loop will become unstable. The update time is related to the time between fringes of optical artifact 153, which is dictated by the artifact FSR and the laser scan rate. Loop filter 160 generates a correction signal 161 that couples to the velocity control of laser 150. The velocity control adjusts the scan rate, $df_{laser}/dt$, of the optical frequency of laser 150 such that it tracks reference oscillator signal 157. The result of the feedback is a scan of optical frequency in which the rate of change of optical frequency per unit time is determined by the frequency of the oscillator. For example, if the oscillator is a clock with equal time intervals between ticks, then the optical frequency will scan with a constant rate of change per unit time.

In order to achieve the desired velocity of the optical frequency sweep, the optical dispersion of the material in the reference etalon must be taken in account. For the case of zero dispersion, the FSR is independent of frequency and $f_{ref}$ is proportional to $df_{laser}/dt$ for all optical frequencies. In contrast, most optical materials exhibit non-negligible optical dispersion. The FSR of an optical artifact comprising typical optical materials is therefore a function of optical frequency. In an embodiment of the invention, $f_{ref}(t)$ is chosen to compensate for dispersion by satisfying the following equation: $f_{ref}(t)=(df_{laser}/dt)/FSR(f_{laser})$.

Figure 15:
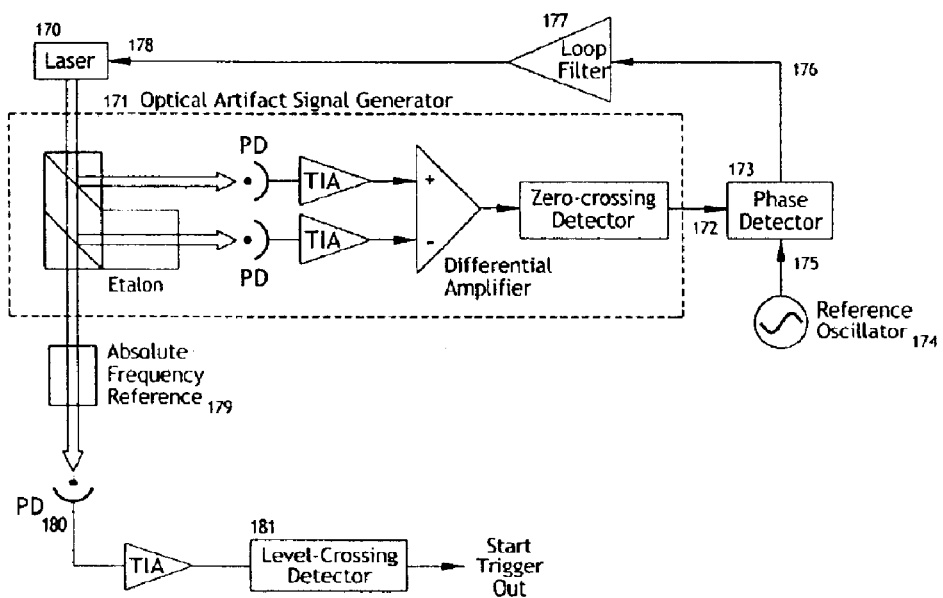
FIG. 15 illustrates an embodiment for feedback control of the optical frequency scan rate of a laser by using free-space coupling of the laser to the wavelength control system.

To illustrate further, the previous embodiment shown in FIG. 10 is modified for controlling the optical frequency scan rate of a laser. Referring to FIG. 15, laser 170 generates an optical beam that is input to optical artifact signal generator 171, which has identical functionality to the similar components shown in FIG. 10 and described previously. The component system 171 generates an optical artifact signal 172 as input to a phase detector 173. Control signal 175 from reference oscillator 174 is coupled to the second input of the phase detector 173, which produces a phase-error signal 176 that is proportional to the phase difference between artifact signal 172 and the control signal 175. Loop filter 177 filters and amplifies phase-error signal 176 to produce a feedback correction signal 178 that is coupled to the frequency control of laser 170. Loop filter 177 is designed so that the feedback to laser 170 is stable and minimizes the phase-error signal 176.

Absolute frequency calibration of the laser frequency scan can be performed by sending light to optical frequency reference 179 and sensing an absorption feature of known frequency with photodetector 180. Level-crossing detector 181 sends a trigger pulse when the detected light power drops below a predetermined signal value. This trigger pulse could be used to start a data acquisition system. Knowledge of the optical frequency of the reference feature and the scan rate of the laser (programmed by reference oscillator 174) is sufficient information for correlating in time external measurements to absolute optical frequencies.

It should be clear to those skilled in the art that replacing certain components of the feedback circuit illustrated in FIG. 15 does not change the essence of the invention schematically in FIG. 14. For example, any or all components of the PLL could be implemented with either analog or digital components. Also, normalizing the signal detection to power fluctuations could be achieved with a divider circuit or an auto-balancing circuit (described previously.) Finally, the laser input could be fiber-coupled as opposed to free-space coupled. Many other arrangements are available without substantially changing the spirit of the invention.

As an example of the utility of the present invention, another embodiment is an optical spectrum analyzer (OSA) device that includes a wavelength meter device to calibrate the optical frequency axis of a spectral measurement. An OSA measures the spectral distribution of an unknown light source, and is typically presented as a spectral power (or density) versus optical frequency. Therefore, highly accurate and repeatable calibration of the optical frequency is a necessity for this application. Furthermore, an OSA requires a fast update rate, and so the real-time frequency calibration offered by the present invention would be very beneficial.

Figure 16:
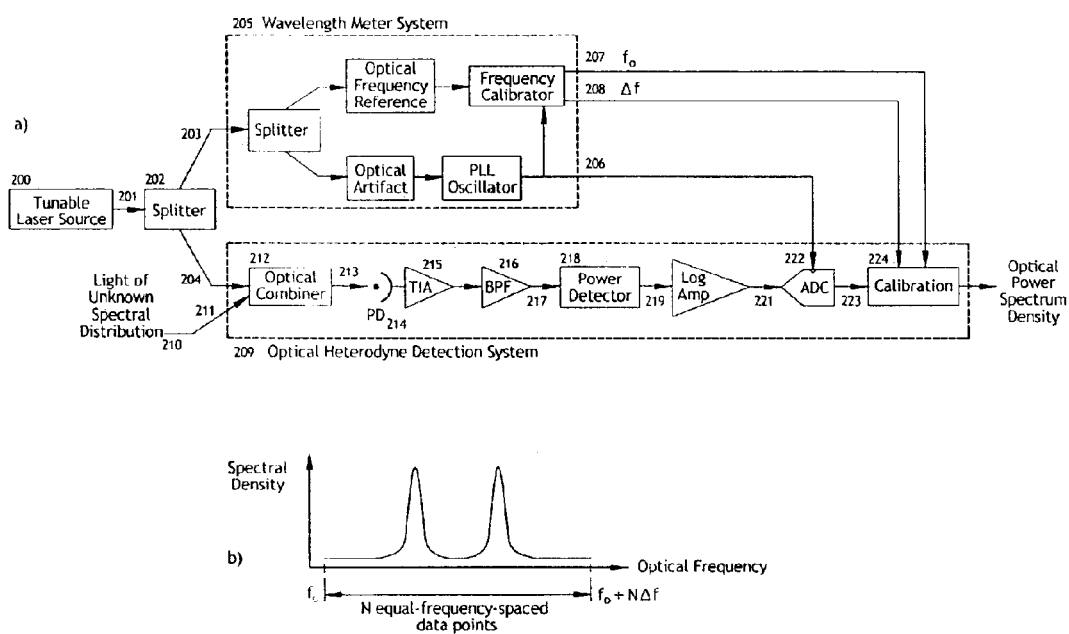
FIG. 16(a) depicts an embodiment of an optical spectrum analyzer device.
FIG. 16(b) shows an example power spectral density measurement made by the optical spectrum analyzer device.

FIG. 16a depicts this embodiment. A first source 200 of coherent optical radiation, whose optical frequency is swept, generates a first optical beam 201 that couples into an optical splitter 202. Optical splitter 202 generates a second optical beam 203 and a third optical beam 204. Second optical beam 203 is coupled to the wavelength meter system 205, which generates a clock signal 206 with ticks separated by equal optical frequency intervals of first source 200, and two calibration parameters: the optical frequency 207 of the first clock tick and the frequency interval 208 between ticks of clock signal 206. Clock signal 206 triggers measurements of optical heterodyne detection system 209.

A second optical source 210 of an unknown spectral distribution generates a fourth optical beam 211, which is provided to an optical combiner 212 of an optical heterodyne detection system 209. Optical combiner 210 interferes third optical beam 204 with fourth optical beam 211 to produce a optical heterodyne beat signal that is the frequency difference of the two combined beams. Optical combiner 212 may utilize polarization-maintaining optical fibers or free-space optics to ensure that the state of polarization (SOP) of light from first source 200 and second source 210 are parallel to one another. Alternatively, combiner 212 may utilize techniques of polarization diversity, wherein light from second source 210 interferes both with the s- and the p-states of polarization of light from source 200. By analyzing interferences with both SOPs, a power measurement independent of the SOP is obtained. In either scheme, interference may be detected as a change of the amplitude of the optical signal of the combined light from source 200 and second source 210.

The optical interference 213 is detected by an optical heterodyne receiver 214, which may be a high-speed optical detector such as a photodiode or other optical-to-electrical receiver. The electrical signal generated by receiver 214 may be processed using standard techniques of RF electronics. For instance, a transimpedance amplifier 215 amplifies the optical interference signal generated by receiver 214. The amplified signal is coupled to a bandpass filter 216 with an electrical transfer function that passes signals between two optical frequency values and rejects other frequencies. The filtered signal 217 may be coupled to a radio-frequency (RF) power detector 218 that produces a signal 219 proportional to the total 1F power in signal 217. A logarithmic amplifier 220 amplifies signal 219 to produce a signal 221 of high dynamic range. Clock signal 206 triggers ADC 222 to convert analog signal 221 to a digital representation 223 at equal optical frequency intervals of tunable laser source 200.

Signal 223 represents the optical power present within the bandwidth of filter 216 (power spectral density) at an optical frequency calibrated by wavelength meter system 205. Signal 223 has an amplitude proportional to the product of the square roots of the optical power amplitudes of first source 200 and second source 210. If the power of first source 200 is known, then the power of second source 210 may be inferred. A calibration circuit 224 interprets signal 223 to identify the optical frequency and optical power spectral density of the second unknown source 210. Using the calibration signals 207 and 208 from wavelength meter system 205, the spectral density measurements of second source 210 may be correlated with optical frequency measurements of first source 200. Adding or subtracting the center frequency of bandpass filter 216 provides the (average) absolute optical frequency of the power spectral density measurement of second source 210. The optical frequency resolution and windowing is set by the width of bandpass filter 216, and the overall response bandwidth of the RF electronics. Calibration of the overall bandwidth from receiver 212 to ADC 222 allows for determination of the optical power of second source 210 per unit bandwidth at a measured optical frequency. FIG. 16b shows an example power spectral density measurement of an unknown source 210 that has a bimodal frequency distribution, with optical frequency axis calibrated by the wavelength meter system 205.

Figure 17:
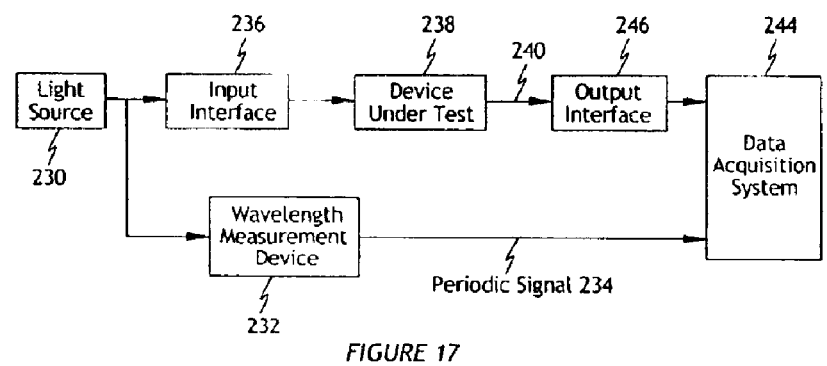
FIG. 17 depicts an embodiment of an optical test system.

As another example of the utility of the present invention, another embodiment is an optical test system for testing a device under test. For such tests, accurate optical frequency information must be correlated with optical measurements of the device under test. A periodic clock relating to the change of optical frequency of an optical source, is a key component of the test system. An embodiment is illustrated in FIG. 17. A light source 230 generates light, whose optical frequency is changed continuously in time, couples to a wavelength measurement device 232 that generates a periodic signal 234 that relates to changes in the optical frequency of source 230. An input interface 236 couples source 230 and a device under test 238. Measurement signal 240 generated by device 238 couples to a data acquisition system 244 via output interface 246. Periodic signal 234 couples to data acquisition system 244 and is used to correlate measurement signals 240 with the optical frequency of source 230.

The foregoing description of an embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wavelength meter system for a source of coherent optical radiation in which the optical frequency is changed continuously in time, comprising:

an optical artifact positioned at least partially in a first optical beam produced by the optical source, the optical artifact configured to generate an optical artifact signal that is periodic relative to an optical frequency of the first optical beam in response to passage of at least a portion of the first optical beam through the optical artifact; and an oscillator that generates an oscillator signal having a plurality of oscillator signal ticks; and wherein the oscillator signal is phase-locked to the optical artifact signal such that the period of the optical artifact signal is a multiple of a period of the oscillator signal.

2. The system of claim 1, wherein the optical artifact is selected from a group consisting of an interferometric device, an etalon, a Mach-Zender interferometer, a Michelson interferometer, a birefringement element coupled with a polarizer, a Lyot filter, an interferometric ring oscillator, and a waveguide loop resonator.

3. The system of claim 1, wherein an optical frequency interval traversed by the optical radiation source between each oscillator signal tick of the plurality of oscillator signal ticks correlates to a free-spectral range (FSR) of the optical artifact divided by some multiple.

4. The system of claim 1, wherein a phase error signal is generated in proportion to a phase difference between the optical artifact signal and the oscillator signal divided in frequency by the multiple, the phase error signal being provided as an input to the oscillator to control the phase difference.

5. The system of claim 1, further including a data acquisition system wherein data logged in time thereby is correlated to the oscillator signal to generate optical frequency data in the data acquisition system.

6. The system of claim 1, further including a data acquisition system wherein the oscillator signal triggers the data acquisition system.

7. The system of claim 1, wherein the optical artifact is a dispersive element with a transmission response that has a period that changes relative to the optical frequency of the first optical beam.

8. The system of claim 1, wherein an optical frequency interval between oscillator signal ticks is generated by adjusting a phase delay to the optical artifact signal that is used for the phase lock.

9. The system of claim 1, wherein an optical frequency interval between oscillator signal ticks is generated by adjusting a time delay to each oscillator tick of the oscillator signal.

10. The system of claim 1, wherein a time interval between each of the plurality of oscillator signal ticks corresponds to an equal interval of optical wavelength.

11. The system of claim 1, further comprising an optical frequency calibration system that determines an optical frequency corresponding to each of the oscillator signal ticks.

12. The system of claim 11, further comprising:
an optical power splitter that divides the first optical beam into second and third optical beams;
a first optical power detector that measures an optical power of a portion of the second optical beam that travels through the optical artifact;
an optical frequency reference positioned along a path of the third beam and having at least one optical spectral feature at a known optical frequency; and
a second optical power detector that measures an optical power of a portion of the third optical beam that travels through the optical frequency reference.

13. The system of claim 12, wherein the optical frequency reference is selected from a group consisting of an atomic/molecular gas cell, an optical fiber Bragg grating, an optical thin-film filter, and a low-thermal-expansion etalon.

14. The system of claim 12, wherein the optical frequency of each oscillator tick is determined from a known calibration of the FSR of the optical artifact and a known optical frequency reference location during a scan of optical frequency of the source of coherent optical radiation that produces the first optical beam.

15. The system of claim 12, wherein the optical frequency of each oscillator tick is determined by correlating oscillator tick locations to two or more known optical frequency reference locations by using a statistical estimation method.

16. The system of claim 12, further comprising a third optical power detector that generates a signal in proportion to the first optical beam, the signal normalizing signals generated from the first and second optical power detectors.

17. The system of claim 1, wherein, subsequent to a sweep of an optical frequency of the coherent radiation source, frequency errors in an oscillator tick axis are reduced by making a correction to each oscillator tick frequency location based upon recorded phase errors between the optical artifact signal and the oscillator signal divided in frequency by the multiple.

18. The system of claim 1, wherein oscillator ticks are produced with time intervals between ticks that correspond to an adjustable optical frequency, wherein adjustment of the optical frequency is produced by adjusting the optical artifact to adjust the periodicity of the optical artifact signal.

19. The system of claim 1, further comprising a processor that detects mode-hops of the source of coherent optical radiation by detecting a substantially discontinuous phase difference between the optical artifact signal and the oscillator signal divided in frequency by the multiple.

20. The system of claim 1, wherein a normalized trigger level for each period of the optical artifact signal is generated by detecting a maximum and minimum of the optical artifact signal over each previous period of the optical artifact signal.

21. A wavelength control system for a source of coherent optical radiation in which the optical frequency is changed continuously in time, comprising:
an optical artifact positioned at least partially in a first optical beam produced by the optical source, the optical artifact configured to generate an optical artifact signal that is periodic relative to an optical frequency of the first optical beam in response to passage of at least a portion of the first optical beam through the optical artifact; and
an oscillator that generates an oscillator signal having a plurality of oscillator signal ticks;
wherein a phase error signal is generated in proportion to a phase difference between the optical artifact signal and the oscillator signal, the phase error signal being used to control the source of the continuously changed optical frequency to control the phase difference.

22. The system of claim 21, wherein the optical source is a tunable laser and the phase error signal is provided to a velocity control input to the tunable laser.

23. The system of claim 21, wherein the phase error signal is filtered prior to being provided as an input to the optical source.

24. The system of claim 23, wherein the filtering includes integration and amplification.

25. The system of claim 21, wherein the oscillator signal generated by the oscillator is variable based on the optical frequency.

26. An optical spectrum analyzer device for analyzing an unknown source of coherent optical radiation, comprising:
a first source of coherent optical radiation in which the optical frequency is changed continuously in time;
a heterodyne optical receiver that detects both the first source of coherent optical radiation together with the unknown source of coherent optical radiation;
a wavelength meter system receptive of the frequency of the optical radiation from the first source, the wavelength meter system further including:
an optical artifact receptive of light from the first source, the optical artifact configured to generate an optical artifact signal that is periodic relative to an optical frequency of the light from the first source in response to passage of at least a portion of the light from the first source through the optical artifact;
an oscillator including a processor that generates a plurality of oscillator signal ticks that are each spaced by a time interval correlating to an interval of the optical frequency of the first source that is a multiple in proportion to a period of the signal of the optical artifact;
the oscillator tick signal is phase-locked to the periodic signal of the optical artifact; and
an optical frequency reference that generates at least one signal with known optical frequency, used for determining the optical frequency of the oscillator signal ticks; and wherein interference relative to detection of the first source and the second unknown source generates a signal whose phase and amplitude, coupled with the optical frequency of each oscillator signal tick, determine the optical power and optical frequency spectrum of the second unknown source.

27. An optical test system for testing a device under test, comprising:

a source of coherent light that can be controlled to sweep through a range of optical frequencies;

a wavelength measurement device receptive of a portion of the light from the light source, the device providing a periodic signal as an output therefrom, the periodic signal having a period that relates to the rate of change of the optical frequency of the light from the light source;

an interface between the light source and the device under test to provide light thereto;

an interface between the device under test and the optical test system for receiving optical or electrical signals therefrom; and a data acquisition system receptive of the optical or electrical energy received from the device under test and receptive of the periodic signal from the wavelength measurement device, wherein the periodic signal allows the data acquisition system to correlate the signals received from the device under test to the optical frequency of the light provided to the device under test.

28. The system of claim 27, wherein the wavelength measurement device further provides a signal indicative of the initial optical frequency and the optical frequency interval between each of the periods of the periodic signal.

* * * * *